United States Patent [19]

Kanenobu et al.

[11] Patent Number: 5,031,460

[45] Date of Patent: Jul. 16, 1991

[54] TRANSDUCER FOR DETECTING PRESSURE CHANGES IN PIPES

[75] Inventors: Muneaki Kanenobu; Kazuhisa Matsumoto, both of Settsu, Japan

[73] Assignee: Daikin Industries, Ltd., Osaka, Japan

[21] Appl. No.: 473,158

[22] Filed: Jan. 31, 1990

[30] Foreign Application Priority Data

Jan. 31, 1989 [JP] Japan .................................. 1-23397

[51] Int. Cl.$^5$ .............................................. G01L 9/08
[52] U.S. Cl. .................................... 73/730; 73/119 A
[58] Field of Search .............................. 73/730, 119 A

[56] References Cited

U.S. PATENT DOCUMENTS 4,541,284  9/1985  Guagliumi et al. ................... 73/730
4,807,479  2/1989  Sako et al. ............................. 73/730

Primary Examiner—Donald O. Woodiel
Attorney, Agent, or Firm—Wenderoth, Lind & Ponack

[57] ABSTRACT

A transducer for detecting pressure changes in pipes by detecting deformation of the pipes and for converting the pressure changes in the pipes into electric signals includes a piezoelectric element having a bimorph structure as a sensor element. The piezoelectric element is constructed in such a way that an intermediate layer is interposed between two piezoelectic pieces. The element is pressed against the pipe surface by a holder which is sufficiently elastic to allow opposite ends of the piezoelectric element in the circumferential direction of the pipe to elastically abut against the pipe periphery. Thereby the ends of the piezoelectric element can be pressed in tight contact against the outer surfaces of pipes having various diameters, and the internal pressure of the pipes can be detected reliably.

14 Claims, 9 Drawing Sheets

Fig.1 (1) Prior art
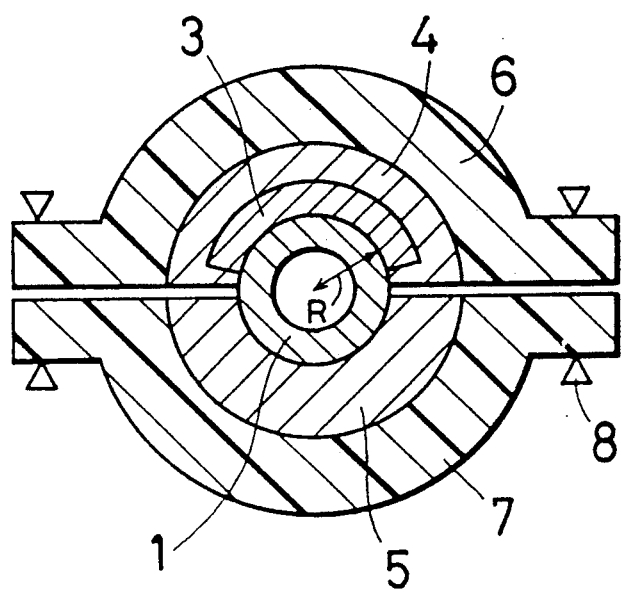
Fig.1(2) Prior art
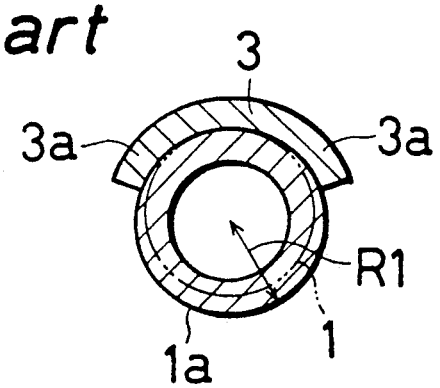
Fig.1 (3) Prior art
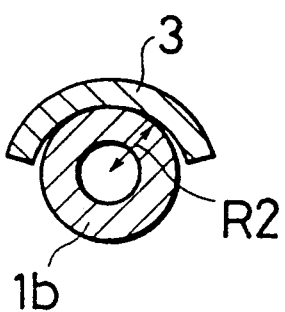

Fig. 6 (1)
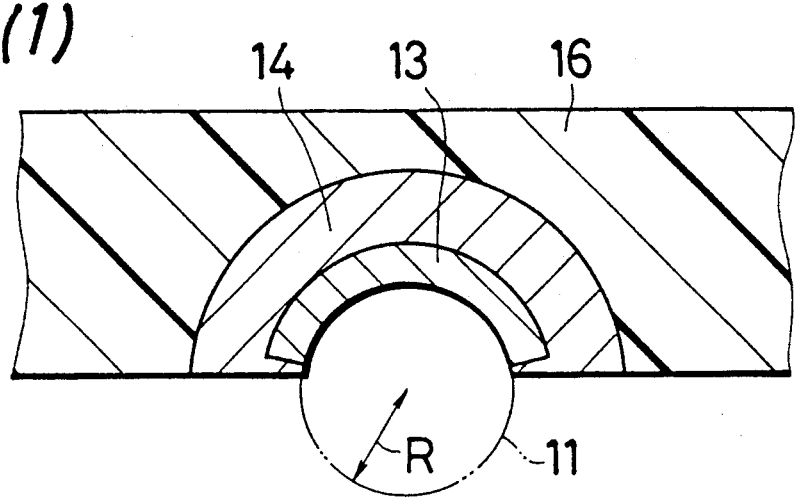
Fig. 6 (2)
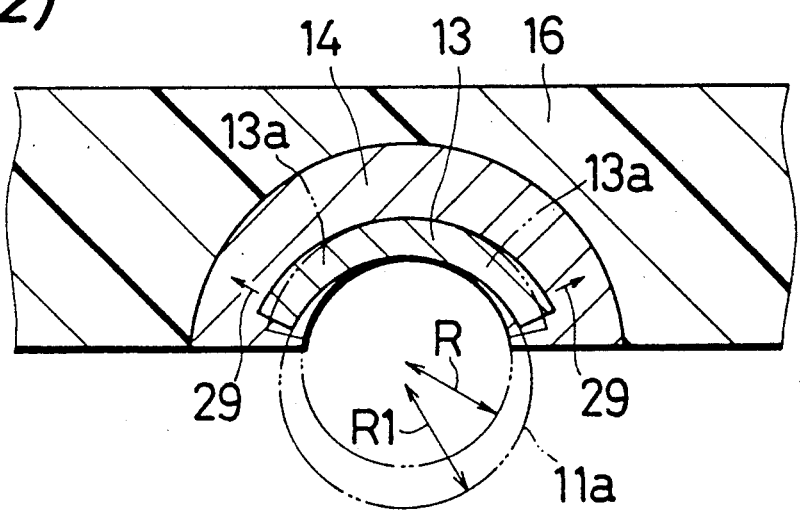
Fig. 6 (3)
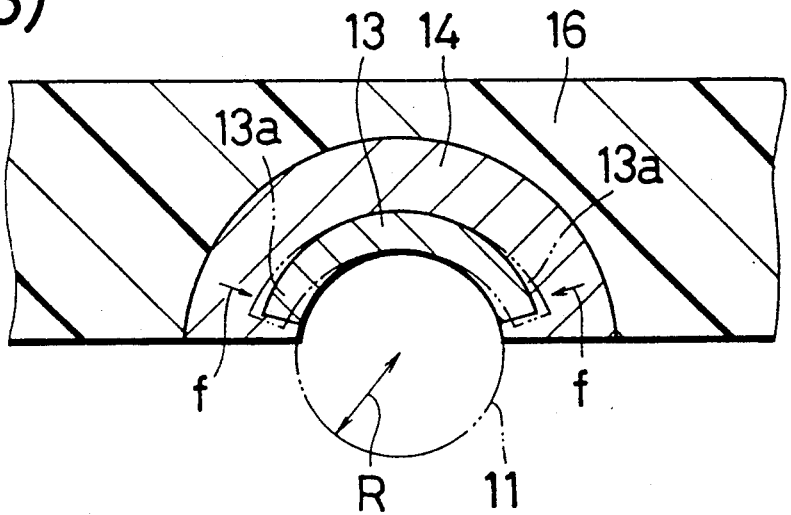

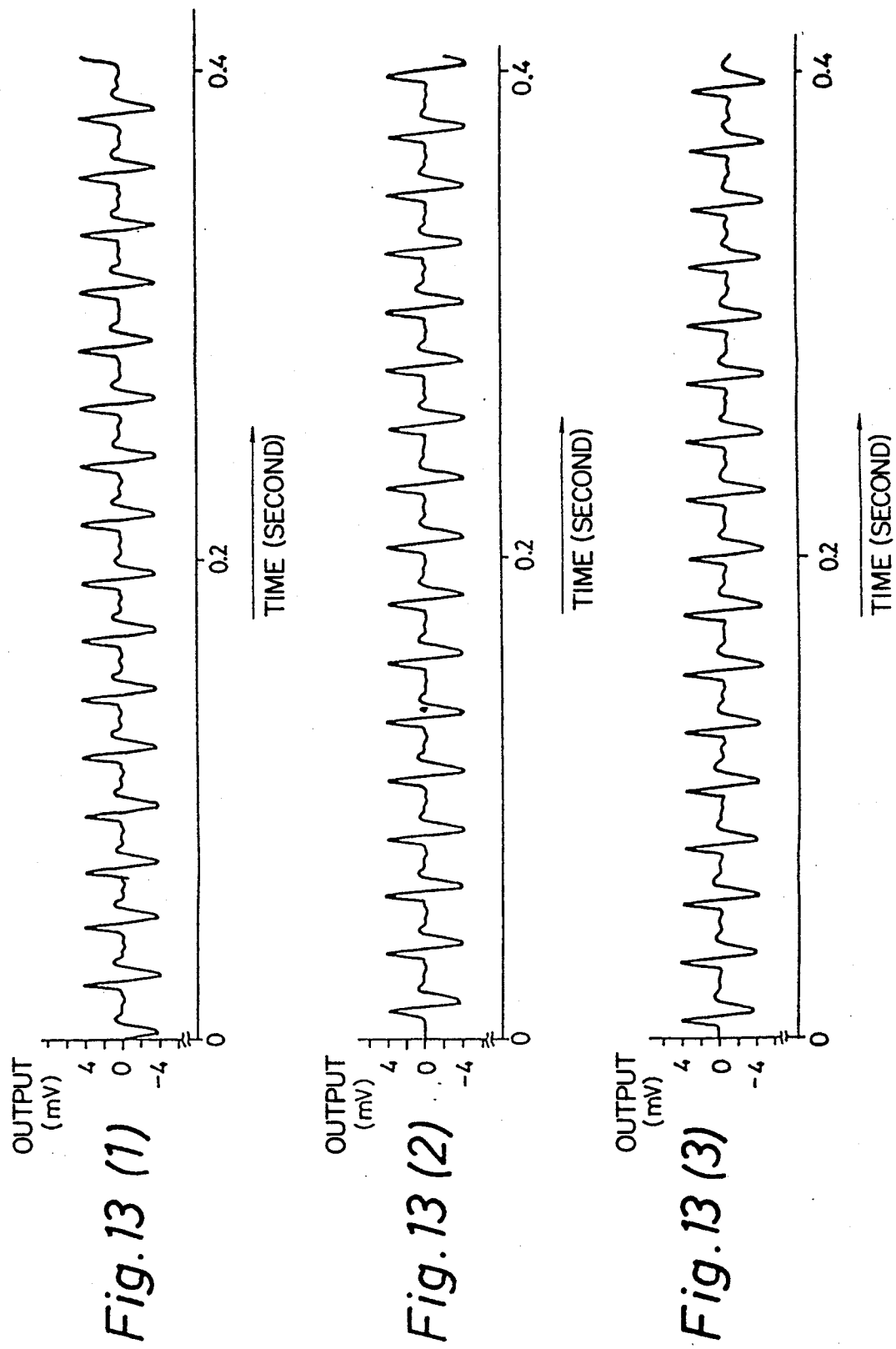

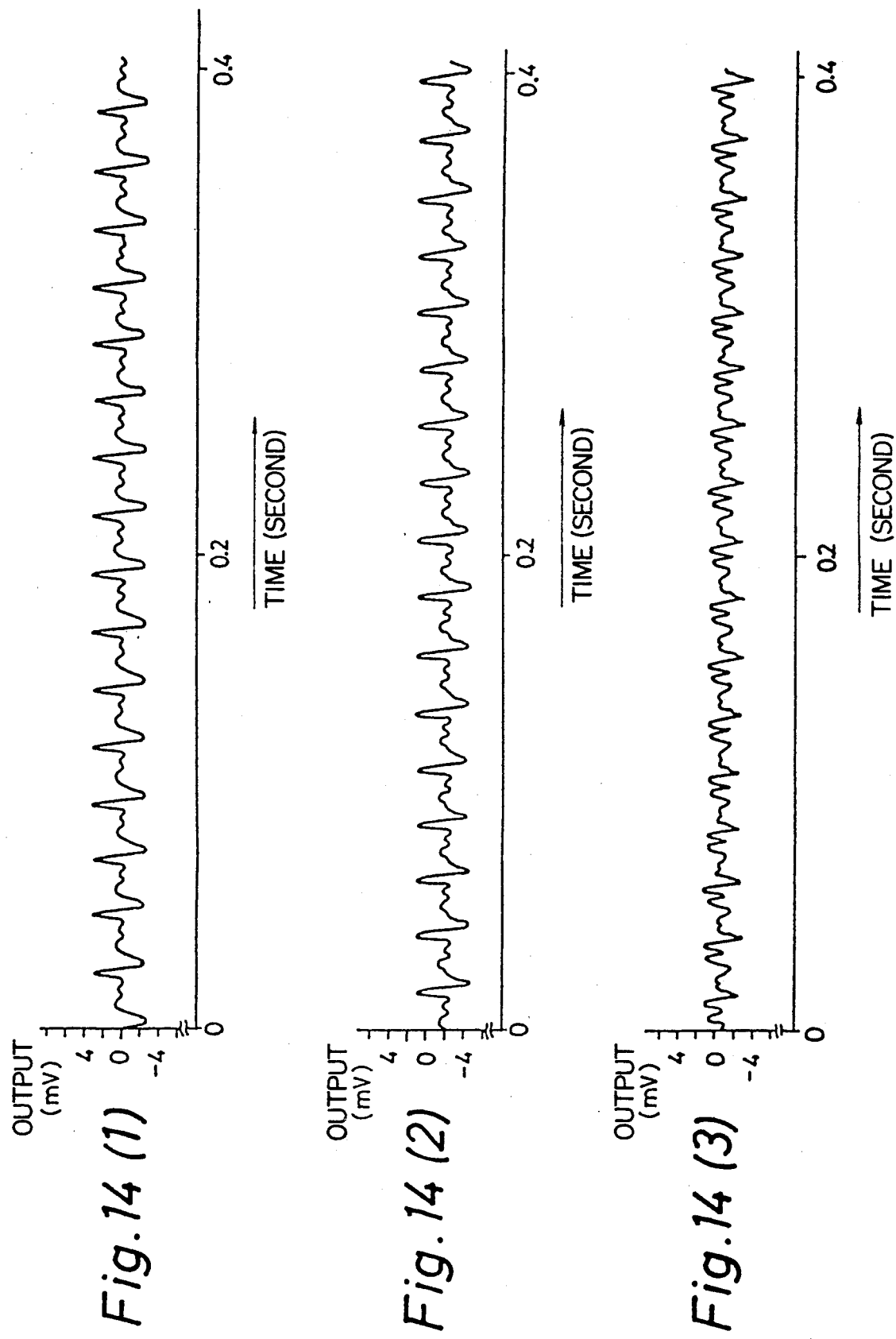

TRANSDUCER FOR DETECTING PRESSURE CHANGES IN PIPES

BACKGROUND OF THE INVENTION

1. Field of the Invention

The present invention relates to a transducer for detecting pressure changes in pipes, for example, pipes for supplying a fuel oil to be injected into a diesel engine and pipes in oil pressure systems, by detecting deformation of the pipes.

2. Description of the Prior Art

A typical prior art arrangement is shown in FIGS. 1(1)–1(3). On a pressure pipe 1 in which a pressure change is to be detected, a piezoelectric element 3 having a bimorph structure is arranged circularly and forced against the pipe 1 by means of a holder 4. A holder 5 is also provided on the pipe 1. The holders 4, 5, hitherto, have been made of a material such as synthetic rubber. From outside the holders 4, 5, cases 6, 7 in the form of two half structures are mounted by means of tightening pieces 8.

When fuel oil is fed into the pipe 1 under pressure, the diameter of the pipe 1 varies accordingly. Thereby, a voltage corresponding to the change in the radius of the pipe 1 is generated in the piezoelectric element 3. By detecting this voltage change, the pressure change in the pipe 1 may be detected.

The holder 4 serves to press the piezoelectric element 3 against the pipe surface so as to trace changes in the pipe diameter at high fidelity.

The piezoelectric element 3 is in tight contact with the pipe 1 when its radius is R in the natural condition as shown in FIG. 1(1).

As schematically shown in FIG. 1(2), when fluid pressure developed in the pipe 1 is enhanced for an instant, the pipe 1 is deformed as shown by the reference numeral 1a and has a radius R1 larger than the radius R of FIG. 1(1). Accordingly since both circumferential ends 3a of the piezoelectric element 3 are contacted tightly to the surface of the pipe 1a, the element 3 is stressed to be spread, and thus the element 3 generates a signal of an electrical voltage which makes it possible to detect the pressure change in the pipe 1a. When the pressure of the fluid in the pipe returns to the original state, the diameter of the pipe simultaneously returns to the original diameter and the piezoelectric element recovers accordingly.

In such prior art arrangement, as shown in FIG. 1(3), when the transducer is utilized on a pipe 1b having a radius R2 smaller than the pipes 1, 1a, opposite circumferential ends 3a of the piezoelectric element 3 may possibly contact loosely the surface of the pipe 1b of reduced diameter. The inventors determined that since the holder 4 is made of synthetic rubber as aforementioned and its compression elastic modulus (young modulus) is relatively small, 10 to $10^2$ kg/cm$^2$, the ends 3a of the piezoelectric element 3 will not be tightly pressed against the pipe.

SUMMARY OF THE INVENTION

It is, therefore, an object of the present invention to provide a transducer for detecting pressure changes in pipes and designed to be utilized generally with pipes having various diameters.

The invention is directed to a transducer for detecting pressure changes in a pipe by converting the deformation of the pipe resulting from internal pressure changes of the pipe into electrical signals, such transducer includes a piezoelectric element having a bimorph structure and constructed in such a way that an intermediate layer is interposed between a pair of piezoelectric pieces. A holder presses the piezoelectric element against an outer surface of the pipe and is elastic so as to allow opposite ends of the piezoelectric element in the circumferential direction of the pipe to abut elastically against the pipe periphery.

In a preferred embodiment of the invention, an outer surface of the holder is covered by a rigid case.

In another preferred embodiment of the invention, the holder is formed into a pair of semi-cylindrical shapes and has a compression modulus of elasticity of 10 to $10^4$ kg/cm$^2$.

In a further preferred embodiment of the invention, the holder is mounted directly on the outer surface of the pipe.

In a still further preferred embodiment of the invention, the material of the holder consists of at least one material selected from the group consisting of polyurethane, polyethylene, polypropylene, tetrafluoroethylene-hexafluoropropene copolymer, tetrafluoroethylene-perfluoro (alkylvinyl ether) copolymer, thermoplastic-polyester elastomer and olefin thermoplastic elastomer.

In another preferred embodiment of the invention, the piezoelectric element pressed against the pipe has, in the natural condition, an inside diameter smaller than the outside diameter of the pipe to be measured.

In a further preferred embodiment of the invention, the holder which presses the piezoelectric element against the pipe surface is formed into a semi-cylindrical shape, and a member having a V-shaped groove faces the holder and contacts the pipe surface with the pipe clamped therebetween.

In a preferred embodiment, the holder is formed into a semi-cylindrical shape, and a member facing the holder has an inner surface having a radius larger than that of the pipe surface.

According to the invention, a piezoelectric element having a bimorph structure is pressed against the pipe surface by a holder which is elastic so as to allow opposite ends of the piezoelectric element in the circumferential direction of the pipe to abut elastically against the outer surface of the pipe. Accordingly, the ends of the piezoelectric element will be contacted tightly against pipe surfaces of pipes having various diameters. Therefore, the internal pressure of such pipes can be detected reliably.

In particular, by selecting a compression modulus of elasticity between $10^2$ to $10^4$ kg/cm$^2$ for the holder, the piezoelectric element can be reliably contacted tightly to outer surfaces of pipes having various different diameters.

As described above, according to the invention, the internal pressure of pipe having various diameters can be detected accurately by the same configuration of transducer.

BRIEF DESCRIPTION OF THE DRAWINGS

These and other objects of the invention as well as features and advantages thereof will be better understood from the following detailed description taken in conjunction with the drawings in which:

FIGS. 1(1)–1(3) are a sectional views of a prior art arrangement,

FIGS. 6(1)-6(3) are a sectional views explaining the operation of the embodiment shown in FIGS. 2 through 5.

DETAILED DESCRIPTION OF THE PREFERRED EMBODIMENTS

Figure 2:
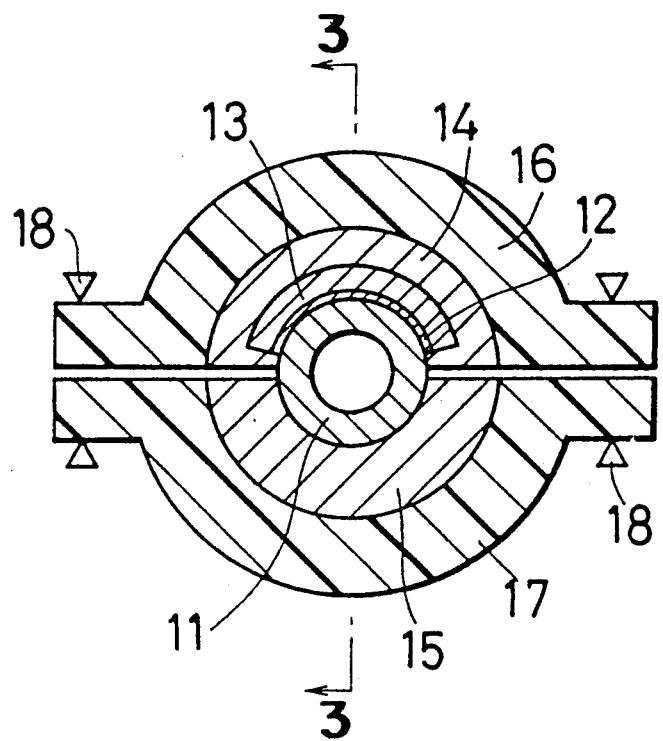
FIG. 2 is a sectional view of one embodiment of the invention.
Figure 3:
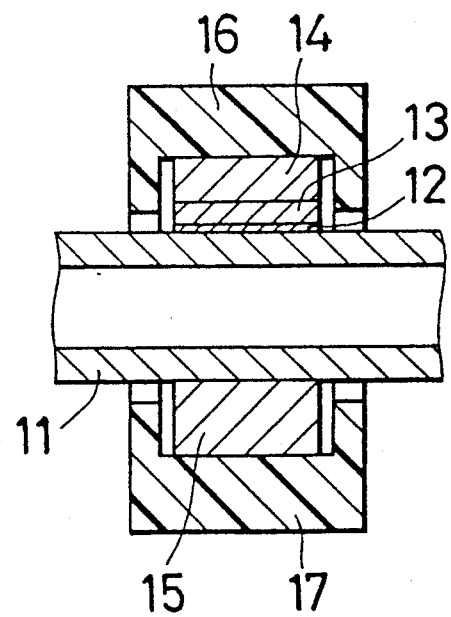
FIG. 3 is a sectional view taken along line 3-3 in FIG. 2.

Referring to the drawings, preferred embodiments of the invention will be described in detail as follows.

Figure 5:
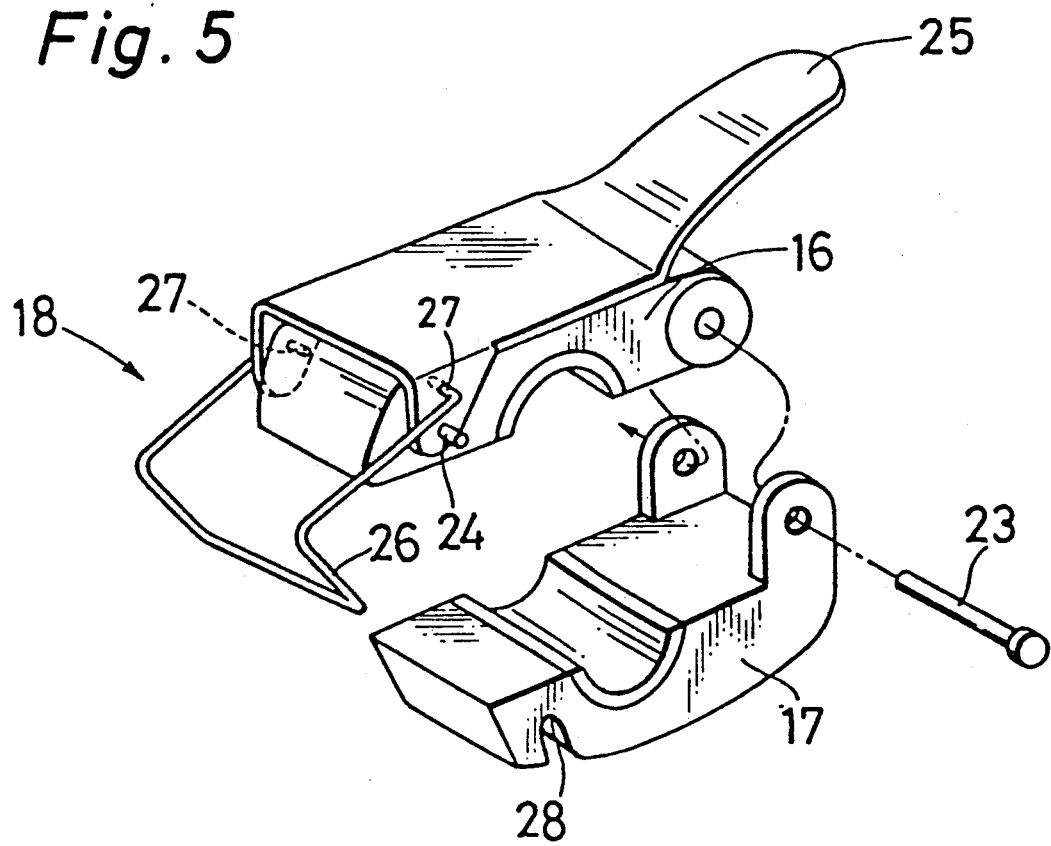
FIG. 5 is a perspective view illustrating a tightening device 18.

FIG. 2 shown a pipe 11, the internal pressure changes of which are to be detected and through which, for example, fuel oil is supplied. A piezoelectric element 13 having a bimorph structure as a sensor element is pressed against pipe 11 by a holder 14 according to the invention via a protective layer 12. The protective layer 12 is to protect the piezoelectric element 13 and consists of a metal foil or the like. A holder 15 directly supports the pipe 11. From outside the holders 14, 15, a pair of generally semi-cylindrical cases 16, 17 are mounted detachably by a tightening device 18 as shown in FIG. 5 to be described later.

Figure 4:
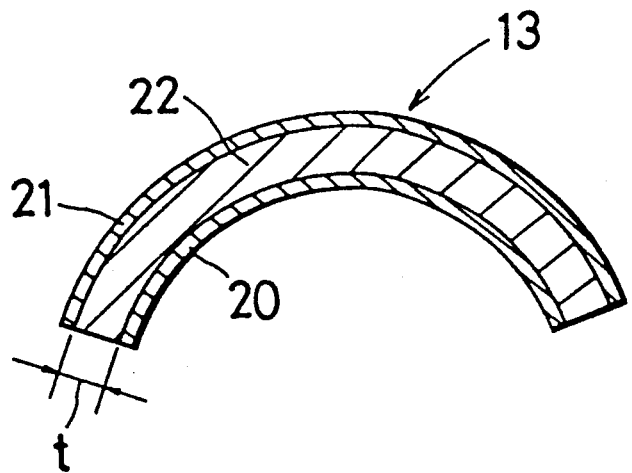
FIG. 4 is a sectional view of a piezoelectric element.

FIG. 4 is a sectional view of the piezoelectric element 13. The piezoelectric element 13 comprises two piezoelectric pieces 20, 21 adhered together via an intermediate layer 22 interposed therebetween.

There are two types of bimorph, namely (1) a serial-type bimorph in which two piezoelectric pieces 20, 21 are adhered together in mutually opposite polarization directions, and electrodes mounted respectively outside thereof are coupled with electric terminals, and (2) a parallel-type bimorph in which two piezoelectric pieces are adhered together in identical polarization directions via an electrode interposed therebetween, and electrodes mounted outside thereof are electrically connected and coupled with the electric terminals together with the intermediate electrode, and both types of bimorph can be used with the invention.

The piezoelectric pieces 20, 21 constituting the bimorph are made of (a) high polymer piezoelectric material or (b) a composite piezoelectric material composed of a mixture of ceramic piezoelectric material with high polymer material or high polymer piezoelectric material. For example, as the high polymer piezoelectric material, vinylidene fluoride polymers such as vinylidene fluoride homopolymer or vinylidene fluoride-trifluoroethylene copolymer may be used.

The measuring principle of the bimorph will be described. The bimorph can detect changes in the pipe diameter caused by pipe internal pressure changes by sensing voltage changes. Supposing the output voltage of the bimorph to be Vp [V], it is expressed as follows:

$$Vp = cgt^2 r^{-1} \qquad (1)$$

where
c: elastic modulus of piezoelectric piece [N/m$^2$]
g: voltage output coefficient of piezoelectric piece [V.m/N]
t: thickness of piezoelectric piece (single) [m]
r: radius of curvature (distance from pipe center to center of bimorph) [m]

As is clear from equation (1), since the output voltage Vp is proportional to the square of the thickness t of a single piezoelectric piece, a greater output voltage is obtained when the thickness of the piezoelectric pieces 20, 21 is increased, so that the sensitivity of detection is enhanced.

Installing the intermediate layer 22 between the piezoelectric pieces 20, 21, is equally efficacious as increasing the thickness of the piezoelectric pieces 20, 21 by the thickness of the intermediate layer 22, so that the sensitivity of detection is improved similarly. The material of the intermediate layer 22 is not particularly limited as long as it is a conductor, and more preferably metal sheets such as copper, aluminum, phosphor bronze, etc. are used. The thickness t of the intermediate layer 22 may be preferably 0.1 to 2.0 mm.

FIG. 5 is a perspective view showing the tightening device 18 provided on the cases 16, 17. First ends of the cases 16, 17 are angularly displaceable about an axis parallel to an axis of the pipe 11 and defined by a pin 23. On the other end of the case 16, a manual lever 25 which is angularly displaceable is pivoted by means of a pin 24. A connecting piece 26 is pivoted at base end portions 27 thereof in an angularly displaceable fashion on manual lever 25. The connecting piece 26 can tighten the cases 16, 17 by being engaged into an engaging groove 28 in the case 17 and being displaced angularly about the axis of the pin 24 of the manual lever 25. It is not intended to limit the invention to the tightening device 18 constructed as shown in FIG. 5.

It is required that the piezoelectric element 13 be pressed on the outer surface of the pipe 11 so as to trace changes in the pipe diameter at high fidelity. For this purpose, the holder 14 is used. Thereby, fine changes in diameter caused by the pipe internal pressure changes of the pipe can be detected. According to the invention, as the material for the holders 14, 15, one or more following materials may be used, polyurethane, polyethylene (PE), polypropylene (PP), tetrafluoroethylene-hexafluoropropene copolymer (FEP), tetrafluoroethylene-perfluoro (alkylvinyl ether) copolymer (PFA), thermoplastic polyester elastomer (commercially available as "Hytrel" trade name by Toray-Dupont) and olefin thermoplastic elastomer (commercially available as "Milastramer" trade-name by Mitsui Petrochemical). A compression modulus of elasticity (Young modulus) of the holders 14, 15 is preferably $10^2$ to $10^4$ kg/cm$^2$ and more preferably about $10^3$ kg/cm$^2$. The cases 16, 17 are made of a material such as nylon or the like and their compression modulus of elasticity is $3 \times 10^4$ kg/cm$^2$.

FIG. 6(1) shows the piezoelectric element 13 attached tightly to the outer surface of the pipe 11 having a radius R in the natural condition. When a transducer having such a configuration is utilized on a pipe 11a having a radius R1 larger than the radius R as shown in FIG. 6(2), both ends 13a of the piezoelectric element 13 are expanded as shown by arrows 29, and the piezoelectric element 13 is pressed tightly against the outer surface of the pipe 11a by the holder 14. In both cases, fine changes in pipe diameter may be measured.

When the transducer of the invention is then utilized again on the pipe 11 having the radius R as shown in FIG. 6(3) from the state shown in FIG. 6(2), the piezoelectric element 13 is returned to the original shape, that is, to the shape shown in FIG. 6(1) by the strong force of the holder 14 being compressed, because the holder 14 has relatively large compression modulus of elasticity as aforementioned. A large force f generated thereby acts on the ends 13a in the circumferential direction of the pipe 11 to press ends 13a tightly against the pipe 11. Accordingly, fine pressure changes in the pipe 11, that is fine deformations of the pipe, can be detected. In FIGS. 6(1)-6(3) the protective layer 12 is omitted for simplification. The protective layer 12 need not be used.

It is enough that the piezoelectric element or the bimorph be pressed on the outer surface of the pipe so as to trace the pipe diameter changes. It is not necessary that the contact be frictional engagement to cause a frictional force to transmit deformation of the pipe surface accurately between the pipe and the piezoelectric element. When the piezoelectric element was a mere piezoelectric piece as in the prior art, it was required that the piezoelectric piece be pressed in frictional engagement in order to detect changes in the peripheral length of the pipe. However, in the case of the present invention using the bimorph, the measuring principle is different, that is, changes in the pipe diameter are detected instead of the changes in the peripheral length of the pipe, and hence it is not necessary to press the piezoelectric piece into frictional engagement with the pipe. Incidentally, in the case of a bimorph, if a force acts in the circumferential direction of the pipe due to changes in the peripheral length of the pipe, changes in voltage are not detected because electric charges generated in the two piezoelectric pieces cancel each other.

In the transducer of the invention, since a bimorph is used in the sensor element, the effects of noise signals cause by vibration of the pipe may be prevented without using a transducer case of a special structure to absorb the supporting force for the sensor element, as in conventional transducers. That is, when an inertial force is built up between the pipe and the piezoelectric element of bimorph type due to pipe vibration, the piezoelectric element is pressed in the direction of thickness by its inertial force, but in this case, the electric charges generated in the piezoelectric pieces of the piezoelectric element cancel each other, so that voltage changes are not detected. Therefore, the structure of the transducer may be much simplified.

Figure 7:
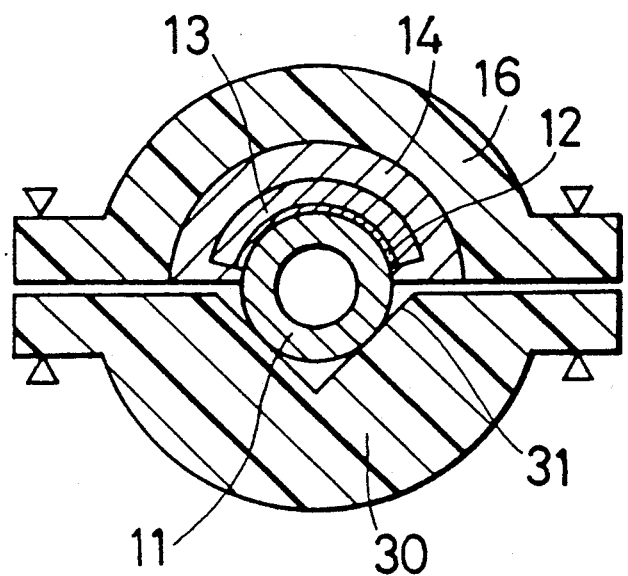
FIG. 7 is a sectional view of another embodiment of the invention.

FIG. 7 is a sectional view of another embodiment of the invention. The parts corresponding to the aforesaid embodiment are designated by the same reference numerals. A case 30 includes a longitudinal V-shaped groove 31. In this embodiment, since the piezoelectric element 13 need not necessarily be disposed symmetrically to the pipe 11, a simplified structure is realized.

Figure 8:
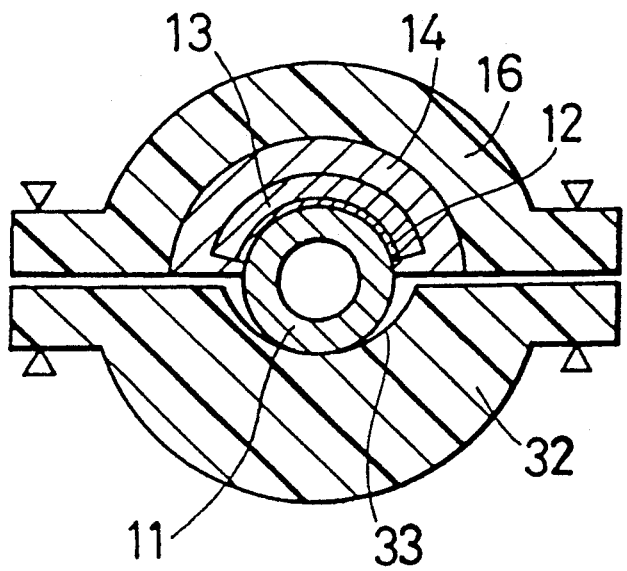
FIG. 8 is a sectional view of a further embodiment of the invention.

FIG. 8 is a sectional view of a further embodiment of the invention. A case 32 includes an inner surface 33 having a large radius of curvature for supporting the pipe 11.

The case 30 in FIG. 7 and the case 32 in FIG. 8 may be either elastic or rigid.

Figure 9:
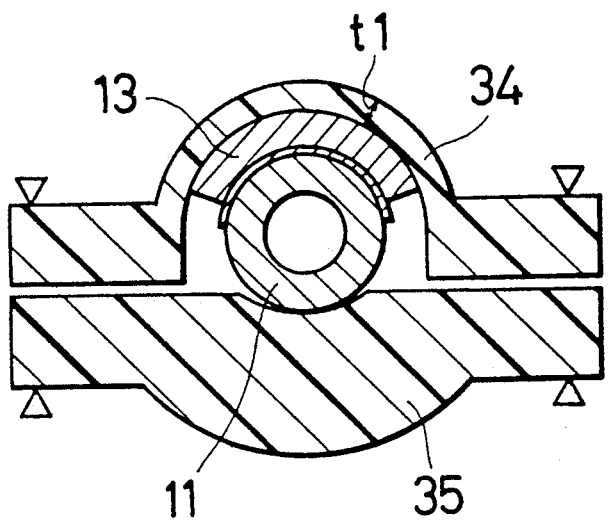
FIG. 9 is a sectional view of still another embodiment of the invention.

FIG. 9 is a sectional view of still another embodiment of the invention. A holder 34 for pressing the piezoelectric element 13 against the pipe 11 serves also as the case 16 aforementioned. As the material for the holder 34, a synthetic resin is used and its thickness t1 is made thinner so as to act the same as the holder 14 having the compression modulus of elasticity previously stated. Another case 35 is rigid.

Figure 10:
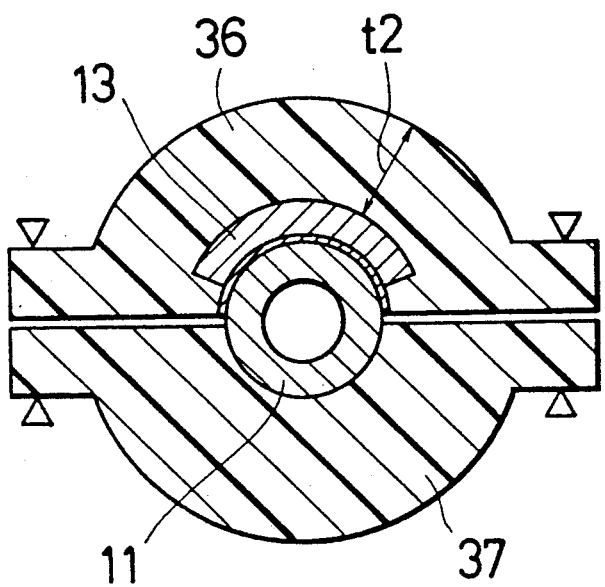
FIG. 10 is a sectional view of another embodiment of the invention.

FIG. 10 is a sectional view of another embodiment of the invention. A holder 36 holding the piezoelectric element 13 acts also as the case 16 and its thickness t2 is made thicker. A case 37 may be made of the same material as the holder 36.

Figure 11:
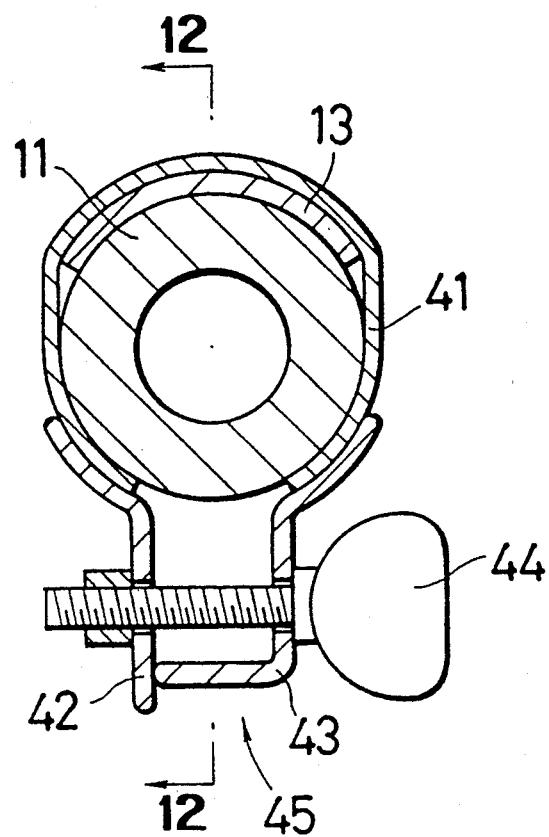
FIG. 11 is a sectional view of still another embodiment of the invention.
Figure 12:
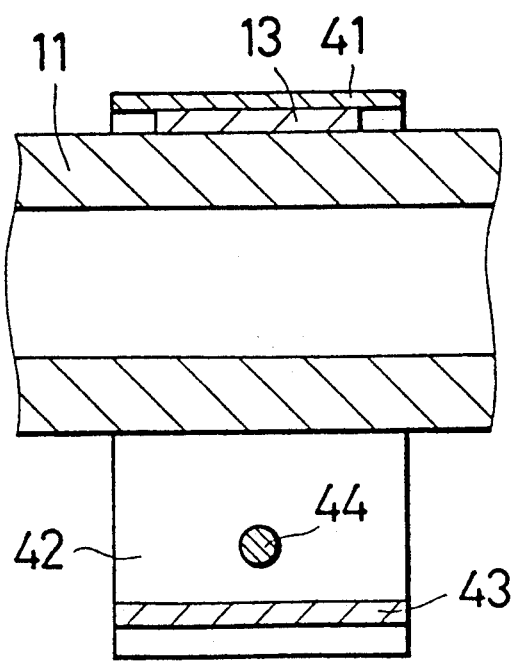
FIG. 12 is a sectional view taken along line 12—12 in FIG. 11, FIGS. 13(1)-13(3) are graphs showing experimental results based on the arrangements shown in FIGS. 2 through 5 of the invention, and FIGS. 14(1)-14(3) are wave-form diagrams showing the experimental results of a relative example.

FIG. 11 is a sectional view of a further embodiment of the invention, and FIG. 12 is a sectional view taken along the line 12—12 in FIG. 11. The piezoelectric element 13 is pressed against the outer surface of the pipe 11 by a band 41 made of an elastically expandable material. Opposite ends of the band 41 are connected by a tightening device 45, tightening pieces 42, 43 of which are connected by means of a bolt 44. The band 41 is in the same manner as the aforesaid holder 14. Since it is not necessary to provide the cases 16, 17 in the embodiment of FIGS. 11 and 12, the structure may be simplified.

Referring to FIGS. 13(1)-13(3) and 14(1)-14(3) experiment results will be described. An engine used in the experiment was that of a Camry (1984 trade mark) by Toyota. The experiment was carried out at an engine speed of 5,000 r.p.m. A transducer was mounted on a fuel injection pipe. FIGS. 13(1)-13(3) and 14(1)-14(3) show wave forms taken after the output of the piezoelectric element 13 was passed through a low-path filter having the characteristics of 120 HZ cut-off frequency and 24 dB/oct Butterworth to remove high-frequency noises. FIGS. 13(1)-13(3) show results of the configurations shown in FIGS. 2 through 6, "Hytrel" (tradename) was used as the material for the holder 14 and compression modulus of elasticity of 900 kg/cm$^2$ was employed. The piezoelectric element 13 was arranged beforehand so as to be pressed on the pipe 11 and the pipe had an outside diameter of 6.0 mm$\phi$ in the natural condition. FIG. 13(1) shows a wave form detected when the outside diameter of the pipe 11 was 6.0 mm$\phi$. At this time, the internal pressure of the pipe 11 was 100 to 200 kg/cm$^2$. FIG. 13(2) shows the wave form detected when a pipe 11 of 6.12 mm$\phi$ outside diameter was measured by a detector having the same construction. FIG. 13(3) shows the wave form when the detector was utilized again on the pipe 11 of 6.0 mm$\phi$ diameter after the pipe 11 of 6.12 mm$\phi$ stated above was clamped and measured. When the output wave forms in FIGS. 13(1) and 13(3) are compared, it is clear that the ends 13a of the piezoelectric element 13 are pressed in tight contact to the outer surface of the pipe 11, thus enabling accurate detection of fine pressure changes.

FIGS. 14(1), 14(2) and 14(3) show a comparative example wherein experiments the same as those of FIGS. 13(1), 13(2) and 13(3) were carried out. In this example, synthetic rubber having a small compression modulus of elasticity was used as a holder material. According to such example, it is clear that substantial noise are involved in FIG. 14(3) and the pipe internal pressure is difficult to measure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and the range of equivalency of the claims are therefore intended to be embraced therein.

What is claimed is:

1. A transducer for detecting pressure changes in a pipe by detecting deformation of the pipe resulting from the inner pressure changes of the pipe and for converting such detected pressure changes into electrical signals, said transducer comprising:
   a piezoelectric element having a bimorph structure, said piezoelectric element having a construction including an intermediate layer interposed between a pair of piezoelectric pieces; and
   a holder for pressing said piezoelectric element against an outer surface of a pipe, said holder being sufficiently elastic to allow opposite ends of said piezoelectric element, taken in the circumferential direction of the pipe, to abut elastically against the periphery of the pipe, said holder being made of at least one material selected from the group consisting of polyurethane, polyethylene, polypropylene, tetrafluoroethylene-hexafluoropropene copolymer, tetrafluoroethylene-perfluoro (alkylvinyl ether) copolymer, thermoplastic polyester elastomer and olefin thermoplastic elastomer.

2. A transducer for detecting-pressure changes in a pipe according to claim 1, wherein an outer surface of said holder is covered by a rigid case.

3. A transducer for detecting pressure changes in a pipe according to claim 2, wherein said holder comprises a pair of semi-cylindrical members having a compression modulus of elasticity of $10^2$ to $10^4$ kg/cm$^2$.

4. A transducer for detecting pressure changes in a pipe according to claim 1, wherein said holder is to be mounted directly on the outer surface of the pipe.

5. A transducer for detecting pressure changes in a pipe according to claim 1, wherein said piezoelectric element has an inside diameter smaller than the outside diameter of the pipe to be measured in the natural condition.

6. A transducer for detecting pressure changes in a pipe according to claim 1, wherein said holder has a semi-cylindrical shape, and further comprising a member having a V-shaped groove to face and contact the pipe with the pipe interposed and clamped between said member and said holder.

7. A transducer for detecting pressure changes in a pipe according to claim 1, wherein said holder has a semi-cylindrical shape, and further comprising a member having an inner surface facing said holder with the pipe to be interposed therebetween, said inner surface having a radius larger than that of the pipe surface.

8. A transducer for detecting pressure changes in a pipe by detecting deformation of the pipe resulting from the inner pressure changes of the pipe and for converting such detected pressure changes into electrical signals, said transducer comprising:
   a piezoelectric element having a bimorph structure, said piezoelectric element having a construction including an intermediate layer interposed between a pair of piezoelectric pieces;
   a holder for pressing said piezoelectric element against an outer surface of a pipe, said holder being sufficiently elastic to allow opposite ends of said piezoelectric element, taken in the circumferential direction of the pipe, to abut elastically against the periphery of the pipe; and
   said piezoelectric element to be pressed against the pipe having an inside diameter smaller than the outside diameter of the pipe in the natural and undeformed condition thereof.

9. A transducer for detecting-pressure changes in a pipe according to claim 8, wherein an outer surface of such holder is covered by a rigid case.

10. A transducer for detecting pressure changes in a pipe according to claim 9, wherein said holder comprises a pair of semi-cylindrical members having a compression modulus of elasticity of $10^2$ to $10^4$ kg/cm$^2$.

11. A transducer for detecting pressure changes in a pipe according to claim 8, wherein said holder is to be mounted directly on the outer surface of the pipe.

12. A transducer for detecting pressure changes in a pipe according to claim 8, wherein said holder has a semi-cylindrical shape, and further comprising a member having a V-shaped groove to face and contact the pipe with the pipe interposed and clamped between said member and said holder.

13. A transducer for detecting pressure changes in a pipe according to claim 8, wherein said holder has a semi-cylindrical shape, and further comprising a member having an inner surface facing said holder with the pipe to be interposed therebetween, said inner surface having a radius larger than that of the pipe surface.

14. A transducer for detecting pressure changes in a pipe by detecting deformation of the pipe resulting from the inner pressure changes of the pipe and for converting such detected pressure changes into electrical signals, said transducer comprising:
   a piezoelectric element having a bimorph structure, said piezoelectric element having a construction including an intermediate layer interposed between a pair of piezoelectric pieces;
   a semi-cylindrical holder for pressing said piezoelectric element against an outer surface of a pipe, said holder being sufficiently elastic to allow opposite ends of said piezoelectric element, taken in the circumferential direction of the pipe, to abut elastically against the periphery of the pipe, said holder having a compression modulus of elasticity of $10^2$ to $10^4$ kg/cm$^2$; and
   a member having an inner surface facing said holder with the pipe to be interposed therebetween, said inner surface having a radius larger than that of the pipe surface.

* * * * *